H. ALLEN.
DRIVING MECHANISM FOR DRILL SPINDLES.
APPLICATION FILED NOV. 30, 1906. RENEWED DEC. 9, 1909.
962,690.
Patented June 28, 1910.
2 SHEETS—SHEET 2.
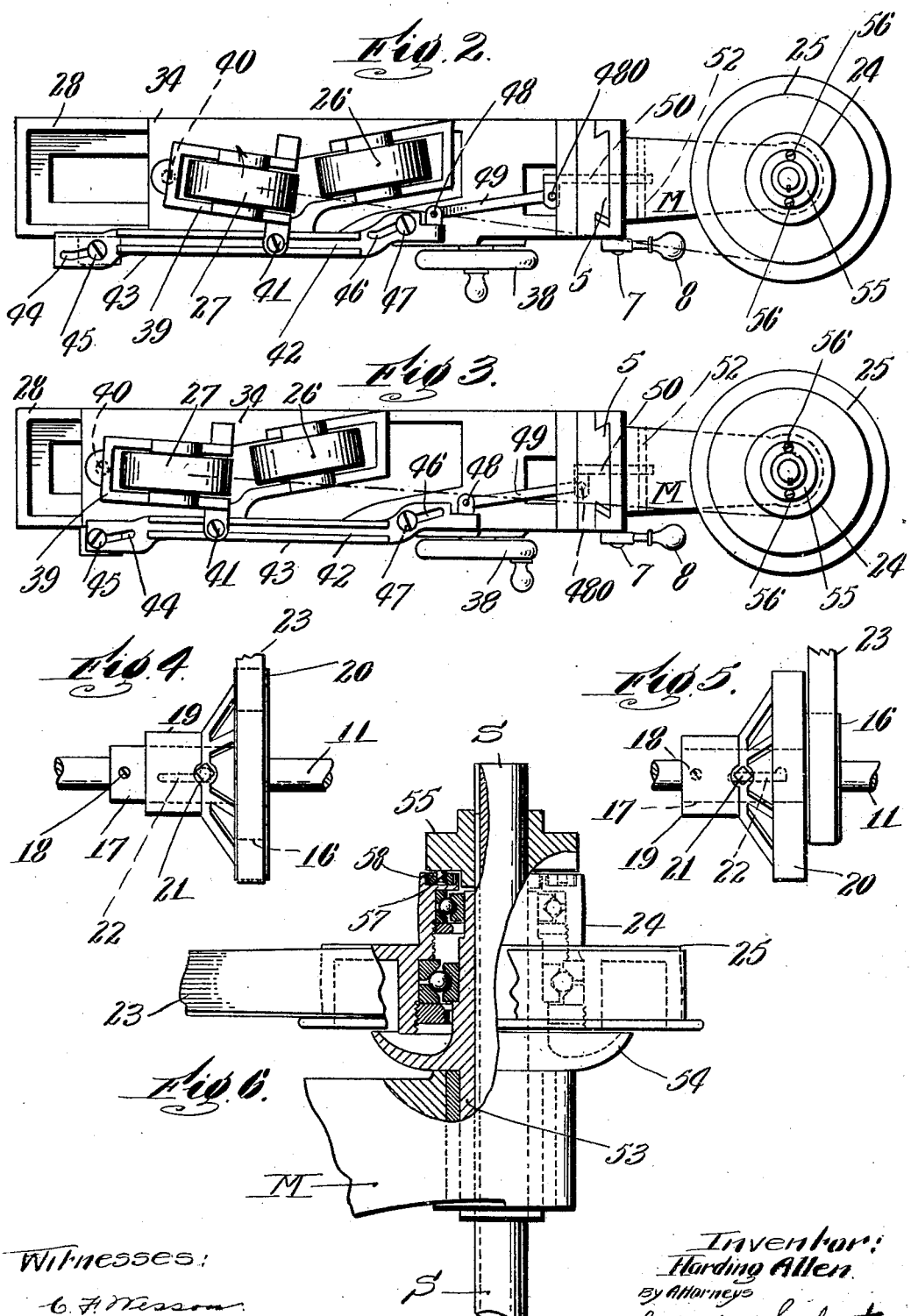

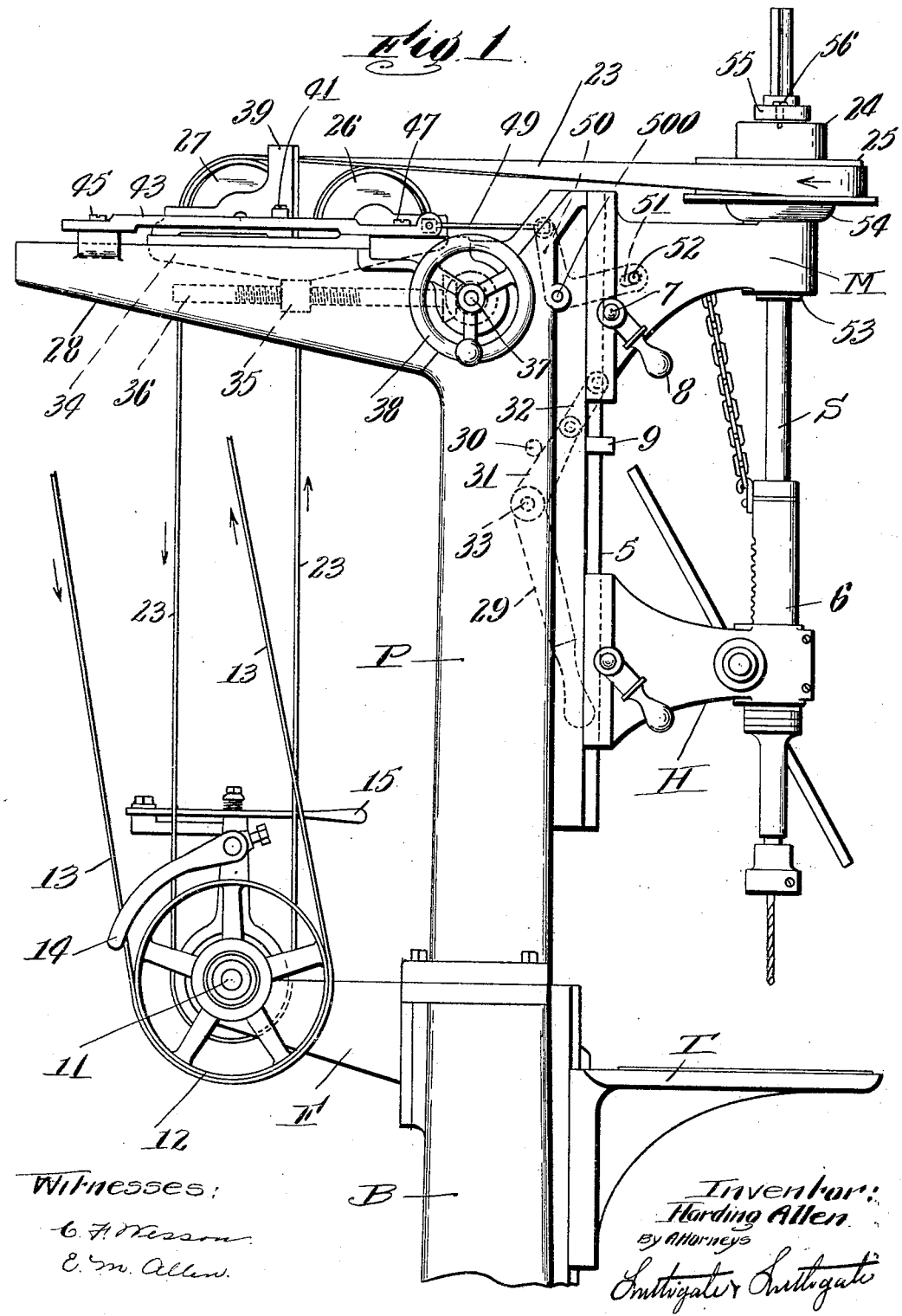

UNITED STATES PATENT OFFICE.

HARDING ALLEN, OF BARRE, MASSACHUSETTS.

DRIVING MECHANISM FOR DRILL-SPINDLES.

962,690.   Specification of Letters Patent.   Patented June 28, 1910.

Application filed November 30, 1906, Serial No. 345,660. Renewed December 9, 1909. Serial No. 532,251.

*To all whom it may concern:*

Be it known that I, HARDING ALLEN, a citizen of the United States, residing at Barre, in the county of Worcester and State of Massachusetts, have invented a new and useful Driving Mechanism for Drill-Spindles, of which the following is a specification.

The object of this invention is to provide improved means for mounting and adjusting a quarter-turn belt so that a vertical shaft, such as a drill spindle, may be powerfully driven, the pulleys maintained in proper running relation with respect to the belt, and the speed of the drill and tightness of the belt changed by simple, direct, and convenient adjustments. In my application for patent filed Sept. 22, 1905, Serial No. 279,641, I have shown an improved mechanism for accomplishing this purpose, consisting in arranging two pulleys on the drill spindle, two pulleys on a counter-shaft and a vertically adjustable carriage supporting the two idler pulleys which give the belt its quarter turn, combined with connections arranged so that as the carriage is moved up or down to cause the belt to track with the upper or lower pulley on the drill spindle, the idler pulley over which the return side of the belt passes will have its angular position automatically adjusted, so that the belt will properly track with the pulley to which the carriage is adjusted. I have improved upon this structure by the arrangement shown in this application for patent, wherein I have dispensed with the vertically adjustable carriage, and have arranged the idler or quarter turn pulleys so that no vertical adjustment thereof is necessary. To do this I provide a vertically adjustable spindle pulley support at the top of the drill spindle, the adjustment of which support controls the vertical position of the two pulleys which drive the drill spindle.

To get automaticity in the adjustment of the idler pulleys I attach connecting means to this movable support, and so arrange the parts that as the movable support is adjusted up or down, the return idler pulley will be automatically adjusted, so that the belt will properly track with the pulley on the drill spindle which is brought into operation. By this arrangement I can provide a firm mounting for the idler pulleys, so that the machine will be stronger and more efficient in operation.

The improvement is illustrated in the accompanying two sheets of drawings, referring to which—

Figure 1 is a side elevation of an upright drill constructed to embody my invention. Fig. 2 is a plan view illustrating the parts adjusted so that the belt will track with the larger of the spindle pulleys. Fig. 3 is a plan view showing the parts adjusted so that the belt will track with the smaller of the spindle pulleys. Figs. 4 and 5 are detail views illustrating the arrangement of pulleys on the counter-shaft, and Fig. 6 is a view partially in section illustrating the way the spindle pulleys are mounted in the adjustable support.

Referring to the drawings and in detail, B designates the base part of the pedestal or column of a drilling machine. Extending forwardly, and adjustably fastened to the front of the base is a work-carrying table T. Extending rearwardly from the base B is a bracket or frame F. Fastened to and extending up from the base B is the column or upper part of the pedestal P. Said pedestal has vertical ways 5 formed on the face thereof in the shape of a dove-tail tenon placed thereon. Fitted on said ways is a movable head H which can be clamped in adjusted vertical position on the ways 5. A quill 6 is journaled in said movable head H, the drill spindle S is journaled in said quill, and said quill is provided with any suitable feeding mechanism so that the drill spindle can be fed during the operation of the machine. These parts may be of any of the ordinary or approved constructions. Also fitted on the ways 5 is a vertically adjustable spindle pulley support M which carries a plurality of driving pulleys for the spindle, as hereinafter described. This support M can be clamped in adjusted vertical position by screw 7 which has a handle 8. A stop 9 is provided to limit the downward movement of the support M.

To adjust the support M up and down a handle 29 is pivoted to the pedestal at 33. The handle 29 has a projecting arm 31 which is connected by a link 32 to the support M. A stop 30 is employed to limit the motion of the arm 31. The pivot 33, the connection between the arm 31 and the link 32, and the point at which the link 32 is pivoted to the support, are arranged in line, whereby when the handle 29 is pulled downwardly, the support M will be raised to its highest position, and will be locked in this position by the arm 31 engaging the stop 30. When the handle is pushed inwardly, the toggle lock will be released, and the support M will come down to the stop 9. By this means the support M can be quickly and accurately adjusted to its highest or lowest position.

Journaled in the bracket or frame F is a driving shaft 11 having tight and loose driving pulleys 12 to which power may be applied by belt 13. Coöperating with the driving belt 13 are shipper fingers 14 which may be operated by a handle 15 to shift the driving belt from the loose to the tight pulley or vice versa.

Mounted on the driving shaft 11 are telescopic pulleys which can be adjusted to drive the spindle S through a quarter turn belt at high speed or low speed as desired. The construction of these pulleys is most clearly illustrated in Figs. 4 and 5. As shown in these figures, a small pulley 16 having an elongated hub 17 is fastened on the driving shaft 11 by a screw 18. Loosely mounted on the hub 17 is a hub 19 having radiating arms carrying an over-hanging belt flange 20. The hub 19 is connected to the hub 17 by a screw 21 which enters a bayonet locking groove 22. When the pin 21 of the large size pulley is in the locking portion of the groove 22, the tension of the quarter turn belt 23 will prevent said pulley from moving laterally, but when a slow speed is desired the machine may be stopped and the large size pulley moved back out of the way as shown in Fig. 5.

As shown in Fig. 1, the support M carries two pulleys in the form of a two-step cone pulley 24 and 25, and this cone pulley is driven from the quarter turn belt 23. The belt passes over idler or quarter turn pulleys 26 and 27, the pulley 27 being the return idler for the quarter turn belt. These pulleys are mounted on an arm 28 which preferably forms part of the pedestal or column P. The tension of the quarter turn belt 23 is regulated by moving the quarter turn pulleys back and forth on the arm 28.

As shown in Figs. 2 and 3, the idler pulleys are arranged in a sliding plate 34 which is fitted to slide on top of the arm 28, the arm 28 being made hollow so that the said plate can be fitted therein. The sliding plate is provided with a nut 35 threaded on a lead-screw 36 connected with a hand-wheel 38. By turning the hand-wheel 38 the idler pulleys can be moved back and forth as desired to secure the proper belt tension. The quarter turn pulley 26 is journaled directly in bearings secured to the top of the sliding plate 34. In order that the quarter turn pulley 27 may have its belt face presented in proper position to receive the return or driving strain of the quarter turn belt 23 it is necessary that this pulley should be swung whenever the spindle pulleys are raised or lowered, or whenever the belt is tightened by moving the quarter turn pulleys forward or backward. I have provided automatic means for maintaining the proper adjustment of the quarter turn pulley 27.

As shown in Figs. 2 and 3, the quarter turn pulley 27 is journaled in a bracket 39 which is pivoted on a pin or stud 40 arranged in the plate 34. Extending from the bracket 39 is a pin 41 which engages a guideway 42 cut in an operating piece 43. The operating piece 43 is provided near one end with a slot 44 for receiving a screw or pin 45 projecting from the arm or bracket 28, and at its other end the operating piece 43 has a slot 46 for receiving another guiding pin or screw 47.

When the parts are in the position illustrated in Fig. 2, the quarter turn pulley 27 has its face presented in proper position to receive the belt from the largest spindle pulley 25. When the belt is run upon the smaller spindle 24, the quarter turn pulley should be swung so as to come to the position indicated in Fig. 3. To accomplish this, the operating piece 43 is provided at its end with a pivoted pin 48 which is connected by a link 49 to a pin 480 secured in the upwardly extending arm of a bell crank lever 50 which is pivoted at 500 in the frame or pedestal of the machine. The other end of the bell-crank lever 50 is slotted as at 51 to receive a pin 52 which is driven into the support M. By means of these connections when the support M is lowered so that the driving belt will run on the smaller spindle pulley 24, the operating piece 43 will be automatically drawn forward, and the cam grooves of the operating piece will shift the same laterally, and also swing the same slightly so that the quarter turn pulley 27 will be automatically set to position, so that its face will stand at the proper angle to receive the belt returning from the smaller spindle pulley. In addition to this, when the quarter turn pulleys are moved to tension the driving belt, the operating piece will also serve to swing or turn the quarter turn pulley to proper position. When the spindle pulley support M is raised so that the quarter turn belt 23 will engage the larger spindle pulley 25, the return idler pulley 27 will be automatically adjusted to the position shown in Fig. 2, so that the belt 23 will properly track with said large pulley 25. Thus, a four-speed drive is obtained between the driving shaft or counter shaft and the drill spindle; that is, the quarter turn pulley may be carried from either pulley on the counter-shaft to either of the two pulleys which drive the spindle.

To mount the pulleys 24 and 25 so that the same will move up and down with the adjustable spindle pulley support M, the construction illustrated in my application for patent filed Feb. 2, 1906, Serial No. 299,163 may be employed to advantage. This is illustrated in Fig. 6 of the drawings, and consists of the following parts:—A bushing 53 having an oil-catching flange 54 is secured in the support. The spindle S passes through this bushing. The pulleys 24 and 25 are made in the form of a two-step cone, and the same are fitted by ball-bearings on said bushing 53, it not being necessary to detail the ball bearings in this application for patent. A driving collar 55 is arranged on top of the pulleys, and is provided with a key to engage with a slot cut in the driving spindle S. The driving collar 55 is provided with holes, loosely fitting in which are screws 56 which serve to prevent axial movement of the driving collar. The driving collar is also provided with depending pins 57 on which are hardened steel collars 58 which work in holes cut in the top of the driving pulleys, suitable hardened steel bearing pieces being fitted in the holes of the driving pulleys, as shown in my application for patent above mentioned. By this arrangement the driving pulleys turn freely on the bushing 53, and impart power to the driving collar 55 which in turn drives the drill spindle. This arrangement is provided so that there will be no cramping. It also will be noted by this arrangement that as the movable spindle pulley support M is raised up and down the pulleys 24 and 25 will move up and down therewith.

By the arrangement described a very simple and smooth running apparatus for the purpose stated is provided.

It will be seen that the adjustable spindle pulley support M can be locked in its upper or lower position so as to form a very strong and practically rigid support for the pulleys and spindle. It also will be seen that all vertical adjustment of either or both of the quarter turn or idler pulleys is done away with, and that the support or arm 28 which holds the same is made part of the frame. This gives a very strong and rigid support for the belt, and eliminates vibration and rattle in the machine.

The details and arrangements herein described may be greatly varied by a skilled mechanic without departing from the scope of my invention as expressed in the claims.

Having thus fully described my invention, what I claim and desire to secure by Letters Patent is:—

1. In a construction of the class described, the combination of a driving shaft, a pulley thereon, a vertical shaft or spindle, pulleys of different sizes for turning the same, means for vertical adjustment thereof so that either pulley may be brought into operation, a quarter turn belt, two idler pulleys, and means for adjusting the position thereof so that the belt can pass to and from either of the spindle pulleys.

2. In a construction of the class described, the combination of a driving shaft, two pulleys thereon, a vertical shaft or spindle, pulleys of different sizes for turning the same, means for vertical adjustment thereof so that either pulley may be brought into operation, a quarter turn belt, two idler pulleys, and means for adjusting the position thereof so that the belt can pass to and from either of the spindle pulleys.

3. In a construction of the class described, the combination of a driving shaft, a pulley thereon, a vertical shaft or spindle, pulleys of different sizes for turning the same, means for vertical adjustment thereof so that either pulley may be brought into operation, a quarter turn belt, two idler pulleys, and means for adjusting the horizontal and angular position thereof so that the belt can pass to and from either of the spindle pulleys.

4. In a construction of the class described, the combination of a driving shaft, two pulleys thereon, a vertical shaft or spindle, pulleys of different sizes for turning the same, means for vertical adjustment thereof so that either pulley may be brought into operation, a quarter turn belt, two idler pulleys, and means for adjusting the horizontal and angular position thereof, so that the belt can pass from either pulley on the driving shaft to either of the spindle pulleys.

5. In a construction of the class described, the combination of a driving shaft, a pulley thereon, a vertical shaft or spindle, pulleys of different sizes for turning the same, means for vertical adjustment thereof so that either pulley may be brought into operation, a quarter turn belt, two idler pulleys, and means whereby the return idler pulley will be adjusted angularly as a vertical adjustment is made of the spindle pulleys.

6. In a construction of the class described, the combination of a driving shaft, two pulleys thereon, a vertical shaft or spindle, pulleys of different sizes for turning the same, means for vertical adjustment thereof so that either pulley may be brought into operation, a quarter turn belt, two idler pulleys, means for moving the same horizontally, and means connected to adjust the angular position of the return idler pulley both from the vertical adjustment of the spindle pulleys and from the horizontal adjustment of the idler pulleys.

7. In a construction of the class described, the combination of a driving shaft, a pulley thereon, a vertical shaft or spindle, a vertically adjustable spindle pulley support, pulleys of different sizes carried thereby, a quarter turn belt, two idler pulleys, and means for adjusting the position thereof so that the belt can pass to and from either of the spindle pulleys.

8. In a construction of the class described, the combination of a driving shaft, two pulleys thereon, a vertical shaft or spindle, a vertically adjustable spindle pulley support, pulleys of different sizes carried thereby, a quarter turn belt, two idler pulleys, and means for adjusting the position thereof so that the belt can pass to and from either of the spindle pulleys.

9. In a construction of the class described, the combination of a driving shaft, a pulley thereon, a vertical shaft or spindle, a vertically adjustable spindle pulley support, pulleys of different sizes thereon, a quarter turn belt, two idler pulleys, and means for adjusting the same connected to the spindle pulley support and arranged so that as the spindle pulley support is adjusted the return idler pulley will be properly adjusted angularly.

10. In a construction of the class described, the combination of a driving shaft, a pulley thereon, a vertical shaft or spindle, a vertically adjustable spindle pulley support, pulleys of different sizes thereon, a quarter turn belt, two idler pulleys, means for adjusting the position thereof, and connections to the spindle pulley support to cause the idler pulleys to assume the right position as the spindle pulley support is adjusted vertically.

11. In a construction of the class described, the combination of a driving shaft, pulleys thereon, a vertical shaft or spindle, a vertically adjustable spindle pulley support, pulleys of different sizes carried thereby, a quarter turn belt, a horizontally adjustable plate, two idler pulleys mounted therein, means for adjusting the position of the idler return pulley, and connections so that this means will be operated both from the vertical adjustment of the spindle pulley support and from the horizontal adjustment of the plate.

12. In a drilling machine, the combination of the frame-work, a driving shaft, pulleys thereon, a spindle, a spindle pulley support vertically adjustable on the frame, an arm extending from the frame, a plate arranged to slide horizontally thereon, idler pulleys mounted on the plate, a quarter turn belt, and means connected to adjust the angular position of the idler return pulley both from the vertical adjustment of the spindle pulley support, and from the horizontal adjustment of the plate.

13. In a drilling machine, the combination of a frame, a vertically adjustable spindle pulley support mounted thereon, pulleys of different sizes carried thereby, and means for vertically adjusting the spindle pulley support so that either pulley may be brought into operation.

14. In a drilling machine, the combination of a frame, a vertically adjustable spindle pulley support mounted thereon, pulleys of different sizes carried thereby, and means for vertically adjusting the spindle pulley support so that either pulley may be brought into operation, comprising a handle, an arm connected with the handle, and a link connected with said arm and with said support.

In testimony whereof I have hereunto set my hand, in the presence of two subscribing witnesses.

HARDING ALLEN.

Witnesses:
Louis W. Southgate,
E. M. Allen.